United States Patent [19]

Shibuya et al.

[11] Patent Number: 4,729,022
[45] Date of Patent: Mar. 1, 1988

[54] MULTIPLEXING SYSTEM

[75] Inventors: Toru Shibuya; Mitsuo Nishiwaki, both of Tokyo, Japan

[73] Assignee: NEC Corporation, Tokyo, Japan

[21] Appl. No.: 701,204

[22] Filed: Feb. 13, 1985

[30] Foreign Application Priority Data

Feb. 17, 1984 [JP] Japan .................. 59-28053

[51] Int. Cl.[4] .................... H04N 7/08; H04N 7/04
[52] U.S. Cl. .................. 358/146; 358/142; 370/111
[58] Field of Search ............ 358/142, 146, 258, 181; 370/111

[56] References Cited

U.S. PATENT DOCUMENTS

| | | | |
|---|---|---|---|
| 3,666,888 | 5/1972 | Sekimoto | 358/145 |
| 4,075,655 | 2/1978 | Iijima et al. | 358/13 |
| 4,215,369 | 7/1980 | Iijima | 358/146 |
| 4,330,858 | 5/1982 | Choquet | 370/111 |
| 4,561,020 | 12/1985 | Matsuda | 358/146 |

*Primary Examiner*—James J. Groody
*Assistant Examiner*—Michael D. Parker
*Attorney, Agent, or Firm*—Schwartz, Jeffery, Schwaab, Mack, Blumenthal & Evans

[57] ABSTRACT

In a multiplexing system wherein data from a plurality of terminal units are multiplexed in time slots shared to the terminal units and coded picture data are multiplexed at least in time slots shared for picture, there are provided picture signal encoding means operating at a clock frequency independent of a clock frequency for a transmission path, a buffer memory circuit for storing the coded picture data outputted from the picture signal encoding means, a data detecting circuit for detecting presence or absence of output data from the plurality of terminal units and a multiplexing circuit which shares coded picture data read out from the buffer memory circuit to a time slot or time slots of terminal units whose output data are not detected by the data detecting circuit and which shares, to time slots of terminal unit whose output data are detected by the data detecting circuit, output data of these terminal units, thereby adaptively sharing coded picture data to the time slots for the terminal units.

3 Claims, 6 Drawing Figures

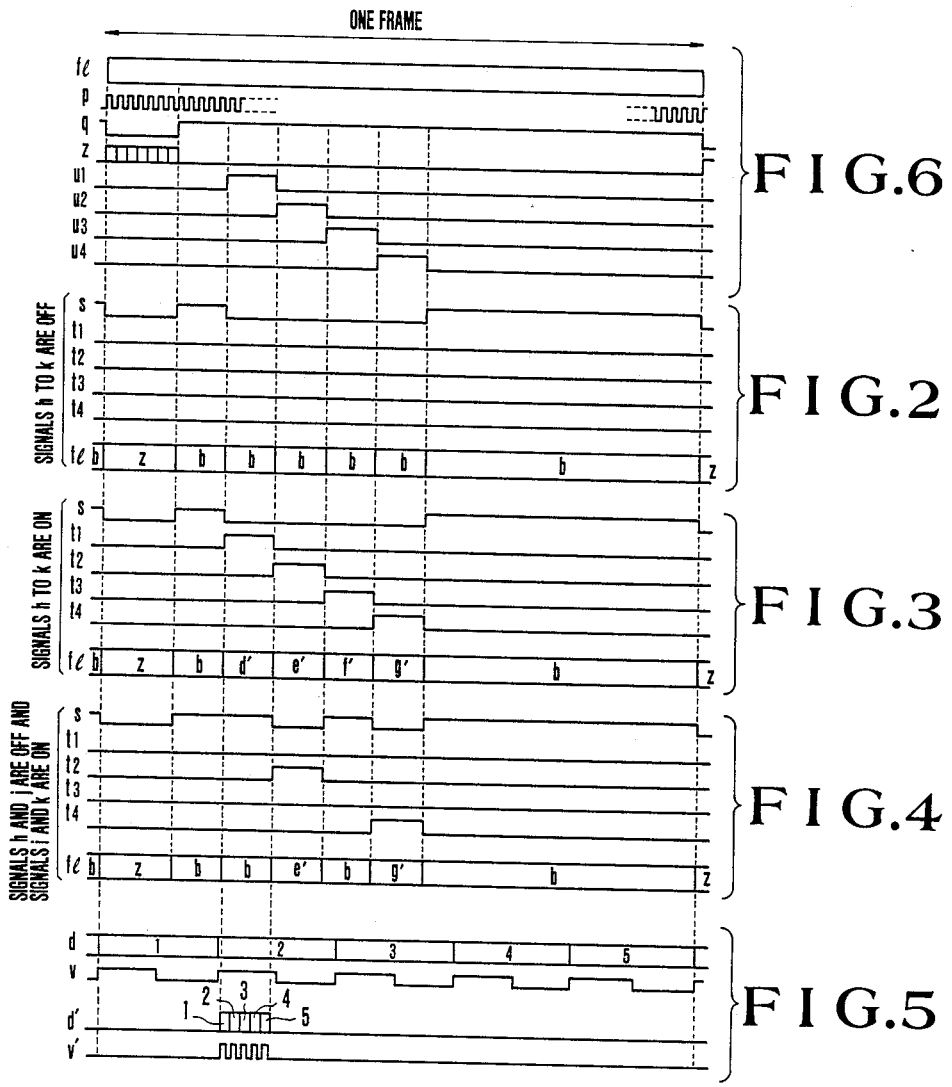

MULTIPLEXING SYSTEM

BACKGROUND OF THE INVENTION

This invention relates to a system of multiplexing coded picture data and output data of terminal units by adaptively changing the bit sharing.

One example of the multiplexing system is disclosed in U.S. Pat. No. 3,666,888. According to this patent, sound and data are multiplexed to occupy time slots from which a horizontal synchronization code word has been removed. This system, however, is disadvantages in that it requires a unique word at the interface between the picture and data, and that the percentage of time slots occupied by the picture signal is fixed.

According to another multiplexing system, since an encoder operating at the same clock frequency as that at the transmission path is used, it is necessary for multiplexing encoded picture data and terminal unit output data to use a transmission path having a higher clock frequency $f_l + \alpha$ than the clock frequency $f_l$ of the existing transmission path.

In an encoder operating at a clock frequency $f_t$ independent of the clock frequency $f_l$ of the transmission path, since there is no data detection circuit that detects presence or absence of the terminal unit output data, the time slot for transmitting terminal unit output data is exclusively shared for the transmission of the terminal unit output data irrespective of the presence or absence of the terminal unit output data. As a result, in the absence of the terminal unit output data, a dummy data is inserted in the time slot adapted for transmitting the terminal unit output data. For this reason, the transmission path is not efficiently utilized. Moreover, as it is impossible to increase the percentage of the time slots occupied by the coded data, it is impossible to improve the picture quality.

SUMMARY OF THE INVENTION

It is an object of this invention to provide an improved multiplexing system capable of increasing the transmission speed of the picture signal by using encoding apparatus operating at a clock frequency $f_t$ independent of the clock frequency $f_l$ of the transmission path and by providing a terminal unit output data detection circuit.

According to this invention, there is provided a multiplexing system wherein data from a plurality of terminal units are multiplexed in time slots shared to the terminal units and coded picture data are multiplexed at least in time slots assigned for picture, characterized in that there are provided picture signal encoding means operating at a clock frequency independent of a clock frequency for a transmission path, a buffer memory circuit storing the coded picture data outputted from the picture signal encoding means, a data detecting circuit for detecting presence or absence of the output data from the plurality of terminal units, and a multiplexing circuit which shares coded data picture read out from the buffer memory circuit to a time slot or time slots of terminal units whose output data are not detected by the data detecting circuit and which shares, to time slots of terminal units whose output data are detected by the data detecting circuit, output data of these terminal units.

BRIEF DESCRIPTION OF THE DRAWINGS

In the accompanying drawings

FIG. 2 is a diagram showing shares of the time slots for the transmission path where there is no terminal unit output data 1 to o;

FIG. 3 is a diagram showing shares of the time slots for the transmission path where there are terminal unit output data 1 to o.

FIG. 4 is a diagram showing shares of the time slots for the transmission path where there are only terminal unit output data 1 and n;

FIG. 5 shows the relation between terminal unit output data d and the output signal d' of a buffer memory circuit; and FIG. 6 is a timing chart showing signals generated by a signal generating circuit shown in FIG. 1.

DESCRIPTION OF THE PREFERRED EMBODIMENT

Figure 1:
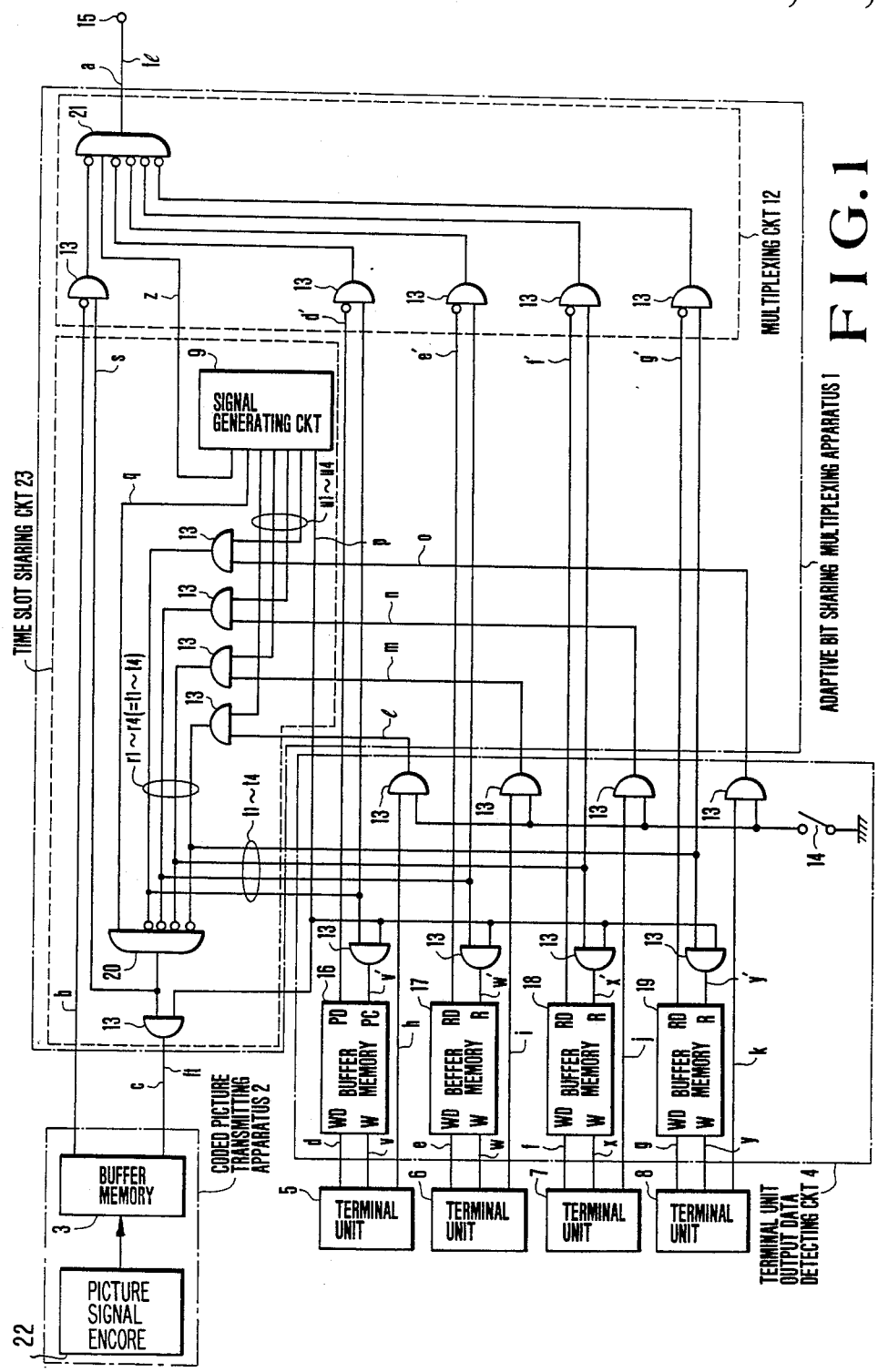
FIG. 1 is a block diagram illustrating an embodiment of the multiplexing system according to this invention.

In a preferred embodiment of this invention shown in FIG. 1 a coded picture transmitting apparatus 2 includes a picture signal encoder 22 which encodes picture data, and a buffer memory 3 which temporarily stores the coded picture data output from the picture signal encoder 22. When an adaptive bit sharing multiplexing apparatus 1 sends a clock signal c of a clock frequency $f_t$ (1 Mb/s to 1.554 Mb/s) to the buffer memory circuit 3 of the coded picture transmitting apparatus 2 operating at the clock frequency $f_t$ (=1 Mb/s to 1.544 Mb/s) independent of a frequency $f_l$ (=1.544 Mb/s) of clock for a transmission path 15, the buffer memory circuit 3 will send out the coded picture data b having the same transmission speed as the clock frequency $f_t$. The clock frequency $f_t$ is determined by the capacity of the buffer memory circuit 3 storing the coded picture data. In this embodiment, the capacity of the buffer memory circuit 3 of the transmitting apparatus is selected to be 1 Mb/s to 1.544 Mb/s.

Four terminal units 5 to 8 each having a transmission speed of 56 Kb/s send, to a terminal unit output data detecting circuit 4, terminal unit output data d to g, sequential clock signals v, w, x and y in synchronism with the terminal unit output data and having a speed of 56 Kb/s, and signals h to k indicative of the presence or absence of the output signal. The detecting circuit 4 detects the presence or absence of the output data of the terminal units and sends, to the multiplexing apparatus 1, signals l to o representing the existence or non-existence of the terminal data (signals l to o are at logic level "1" when the output data are present whereas at logic level "0" when there is no output data). Furthermore, by using buffer memories 16 to 19 responsive to the clock signals v, w, x and y and clock signals v', w', x' and y' equivalent to a clock p to be described later, the detecting circuit 4 converts the sequential terminal unit output data d to g of 56 Kb/s into burst shaped data d' to g' which in turn are fed to the multiplexing apparatus 1. The relationship between the terminal unit output data d to g and the buffer memory output signals d' to g' is shown in FIG. 5, in which only the relation between d and d' is typically shown.

When an adaptive bit sharing switch 14 is closed, the detecting circuit 4 can change signals l to o representing the presence or absence of the data to a state representative of no terminal unit output data, that is, logic "0".

The signals l to o representing the presence or absence of the data are fed to a time slot sharing circuit 23. A signal generating circuit 9 comprises an oscillator oscillating at a frequency of 1.544 MHz and a frequency divider and produces the clock p of 1.544 MHz, picture data sharing signal q, a terminal data allotting signals u1 to u4, a signal z for frame and other information. These signals are formed by using a ROM and the timings of these signals p, q, u1 to u4 and z are shown in FIG. 6.

The terminal data allotting signals u1 to u4 are controlled by signals l to o indicative of the presence or absence of the terminal data to produce time slot allotting signals r1 to r4 only when the terminal data are existent. The picture data sharing signal q is controlled by the time slot alloting signals r1 to r4 to produce picture data time slot sharing signal s. More particularly, in response to the signals l to o, signals r1 to r4 are changed to "0" to stop the generation of the picture data read clock signal c, thus stopping read out of the picture signal b.

On the other hand, the time signal sharing signals s and t1 to t4 for the data and picture signals as well as frame and other information signal z are sent to a multiplexing circuit 12 which multiplexes the coded picture data b, the terminal unit output data d' to g' and frame and other information signal z according to the timings of signals s and t1 to t4 and sends out a multiplexed signal to the transmission path 5.

A number of two-input AND gates 13, a single five-input AND gate 20 and a single six-input AND gate 21 are arranged and connected as shown in FIG. 1 to participate in the operation described above.

FIG. 2 shows the sharing of time slots to one frame for the transmission path when signals l to o showing the presence or absence of the terminal unit output data are at logic level "0", that is, there is no terminal unit data or the switch 14 is OFF. As shown, with the signals h to k being OFF, the coded picture data b is positioned in a time slot next to a time slot for the signal z, and adjacent the following four time slots allotted for output data transmission of the terminal units 5 to 8, and to a single relatively long time slot assigned for coded picture data transmission.

FIG. 3 shows the sharing of the time slots to one frame for the transmission path when the signals l to o showing the presence or absence of the terminal unit output data are at "1", that is, when there are terminal unit output data. As shown, with the signals h to k being ON, the coded picture data b is positioned in a time slot next to the signal z, and adjacent the data d' to g' corresponding to the terminal unit output data d to g allotted to the following four time slots for output data transmission of the terminal units 5 to 8. The coded picture data b is assigned to the last relatively long time slot for coded picture data transmission.

FIG. 4 shows the sharing of the time slots to one frame for the transmission path when the signals l and n showing the presence or absence of the terminal unit output data are at logic level "0" and signals m and o are at logic level "1", that is, when there are no terminal output data d and f and there are the data e and g. As shown, with the signals h and j being OFF and the signals i and k being ON, the coded picture data b is positioned in a time slot next to a time slot for the signal z and also adjacent time slots for output data transmission of the terminal units 5 and 7. The data e' and g' corresponding to the terminal unit output data e and g are assigned to time slots for the terminal units 6 and 8, and the coded picture data b is allotted to the last relatively long time slot for coded picture data transmission.

As described above, the assignment of the time slots to one frame for the transmission path is determined by the adaptive bit sharing multiplexing apparutus 1 and a multiplexed signal a is output to the transmmitting path 15. Where the frequency $f_f$ of the clock for the transmission path, the number of terminal units, the output data of the terminal units and the transmitting speed of terminal unit output data are different from those of the embodiment described above, the adaptive bit sharing multiplexing system may also be employed, although output data are different from those of the embodiment described above.

As mentioned above, according to this invention, the adaptive bit sharing multiplexing system is provided with a buffer memory circuit, a data detecting circuit and a multiplexing circuit so as to multiplex signals by adaptively changing the bit sharing. As a consequence, where there is no terminal unit output data, the transmission speed of the picture signals can be increased, thereby improving the picture quality.

What is claimed is:

1. A multiplexing system wherein data from a plurality of terminal units are multiplexed in time slots allocated to the terminal units and coded picture data are multiplexed at least in time slots allotted for picture data, the system comprising:

a picture signal encoding circuit operating at a clock frequency independent of a clock frequency for a transmission path;

a buffer memory circuit for storing coded picture data output from said picture signal encoding circuit;

a data detecting circuit for detecting the presence or absence of output data from said plurality of terminal units; and a multiplexing circuit which allocates coded picture data read out from said buffer memory circuit to a time slot or time slots of terminal units whose output data are not detected by said data detecting circuit and whenever data to be output from any one of said terminal units is detected by said data detecting circuit, inserts the detected data into the time slot allotted to said terminal units which outputted the detected data, thereby adaptively sharing coded picture data to the time slots for said terminal units.

2. A multiplexing system for multiplexing coded picture data with data from a plurality of terminal units, said multiplexing system comprising:

encoding means, operating at a first clock frequency, for encoding a picture signal and generated coded picture data;

buffer means for storing the coded picture data generated by said encoding means;

detection means for detecting the presence or absence of data reception from each of said plurality of terminal units;

multiplexing means for generating a multiplexed signal having time slots allocated to said plurality of terminal units and a time slot allocated to said coded picture data, said multiplexing means inserting said coded picture data received from said buffer means into the time slots allocated to terminal units from which an absence of data reception has been detected by said detection means, and transmission means, coupled to said multiplexing means, for transmitting said multiplexed signal at a second clock frequency.

3. A method of operating a multiplexing system for multiplexing coded picture data with data from a plurality of terminal units, said method comprising the steps of:

encoding a picture signal with an encoder and generating coded picture data at a first clock frequency;

storing the coded picture data generated by said encoder in a buffer;

detecting, with a detection circuit, the presence or absence of data reception from each of said plurality of terminal units;

generating, with a multiplexing circuit, a multiplexed signal having time slots allocated to said plurality of terminal units and a time slot allocated to said coded picture data, said multiplexing circuit inserting coded picture data received from said buffer into the time slots allocated to terminal units from which an absence of data reception has been detected by said detection circuit, and transmitting said multiplexed signal at a second clock frequency.

* * * * *